US010127947B2

(12) United States Patent
Albrecht et al.

(10) Patent No.: US 10,127,947 B2
(45) Date of Patent: Nov. 13, 2018

(54) DATA STORAGE SYSTEM ENCLOSURE WITH CENTRAL MOUNTING PLATE

(71) Applicant: Western Digital Technologies, Inc., Irvine, CA (US)

(72) Inventors: Thomas R. Albrecht, San Jose, CA (US); Darya Amin-Shahidi, San Jose, CA (US); Toshiki Hirano, San Jose, CA (US); Lidu Huang, Danville, CA (US); Jeffrey D. Wilke, Palmer Lake, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 15/390,433

(22) Filed: Dec. 23, 2016

(65) Prior Publication Data
US 2018/0182438 A1 Jun. 28, 2018

(51) Int. Cl.
*G11B 33/12* (2006.01)
*G11B 33/02* (2006.01)
*G06F 1/18* (2006.01)

(52) U.S. Cl.
CPC ............ *G11B 33/128* (2013.01); *G06F 1/187* (2013.01); *G11B 33/02* (2013.01); *G11B 33/126* (2013.01)

(58) Field of Classification Search
CPC ..... G11B 33/128; G11B 33/126; G11B 33/02; G11B 33/127; G06F 1/187; G06F 1/184; H05K 7/1487
USPC ........................................ 361/679.33, 679.37
See application file for complete search history.

(56) References Cited
U.S. PATENT DOCUMENTS

| 5,398,157 | A | * | 3/1995 | Paul | G06F 1/184 248/221.11 |
| 5,566,049 | A | | 10/1996 | Nguyen | |
| 5,912,799 | A | | 6/1999 | Grouell et al. | |
| 6,466,449 | B1 | | 10/2002 | Sheen et al. | |
| 7,031,152 | B1 | * | 4/2006 | Tsai | G06F 1/184 312/223.2 |
| 7,237,854 | B2 | | 7/2007 | Chen | |
| 7,362,572 | B1 | * | 4/2008 | Wierzbicki | H05K 7/1487 174/16.1 |

(Continued)

OTHER PUBLICATIONS

Black Vortex MB074SP-B, 2 pages, downloaded on Feb. 18, 2016 from http://www.icydock.com/goods.php?id=166.
(Continued)

*Primary Examiner* — Dimary Lopez-Cruz
*Assistant Examiner* — Abhishek Rathod
(74) *Attorney, Agent, or Firm* — John D. Henkhaus (57) ABSTRACT

A data storage system assembly includes a rigid central plate with multiple data storage devices (DSDs) mounted on the central plate, where a first row of DSDs is coupled with a first side of the central plate, and a second row of DSDs is coupled with a second side of the central plate, both in a side-by-side arrangement. A plurality of flexible mounting grommets may be fastened to each DSD and coupled to the central plate, such as in an arrangement in which an even number of grommets are fastened to one side and an odd number of grommets are fastened to an opposing side of the DSD. Each respective DSD may be fastened to a corresponding adaptor plate, where each adaptor plate is coupled with the central plate. Flexible mounting grommets may be fastened to each adaptor plate and coupled to the central plate.

22 Claims, 5 Drawing Sheets

(56) References Cited

U.S. PATENT DOCUMENTS

| | | | |
|---|---|---|---|
| 7,570,484 B1 | 8/2009 | Sivertsen | |
| 7,719,828 B2 | 5/2010 | Brown et al. | |
| 8,254,109 B2 | 8/2012 | Sun | |
| 8,599,550 B2 | 12/2013 | Davis et al. | |
| 2002/0017838 A1* | 2/2002 | Roesner | G06F 1/184 312/223.1 |
| 2006/0171110 A1* | 8/2006 | Li | G06F 1/184 361/679.37 |
| 2007/0233781 A1* | 10/2007 | Starr | G11B 33/126 709/203 |
| 2011/0141874 A1* | 6/2011 | Starr | G11B 33/125 369/212 |
| 2013/0050955 A1* | 2/2013 | Shinsato | G06F 1/181 361/727 |
| 2013/0114202 A1 | 5/2013 | Lin et al. | |
| 2013/0277512 A1* | 10/2013 | He | H05K 7/14 248/213.2 |
| 2014/0263907 A1 | 9/2014 | Mason | |
| 2015/0077924 A1* | 3/2015 | Rauline | H05K 7/1489 361/679.39 |
| 2015/0359115 A1* | 12/2015 | Hirano | G06F 1/181 361/679.34 |

OTHER PUBLICATIONS

Mediasonic, Mediasonic 4X 4-bay enclosure, 4 pages, downloaded from http://www.mediasonic.ca/files/1358241732_0.pdf.

OWC, Multi-Mount Drive Converter Bracket, Assembly Manual, 16 pages, Oct. 6, 2015, downloaded from http://eshop.macsales.com/tech_center/manuals/multi-mount/owcmanmultimnt_r4w.pdf.

\* cited by examiner

DATA STORAGE SYSTEM ENCLOSURE WITH CENTRAL MOUNTING PLATE

FIELD OF EMBODIMENTS

Embodiments of the invention may relate generally to data storage systems and, more particularly, to mounting of data storage devices in a data storage system.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head uses a magnetic field to read data from and write data to the surface of a magnetic-recording disk. A write head makes use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

There is a commercial demand for digital data storage systems, in which multiple hard disk drives (HDDs) are housed in a common enclosure. Data storage systems often include shelves, or "sleds", on which one or more rows of HDDs are mounted. As such, a given HDD may have an adjacent neighbor HDD arranged in close position thereto, in either a side-by-side and/or an over-under type of arrangement. In operation, such as when an HDD is actively seeking, a voice-coil motor (VCM) generates torque in moving a head-stack assembly (HSA) over the disk stack. In turn, this VCM torque may be transferred to the structure to which the HDD is mounted, whereby force and/or motion may be transferred to neighbor HDDs. Hence, each HDD may experience positioning errors as a result of such mechanical cross-coupling.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are directed toward a data storage system assembly comprising a rigid central plate and a plurality of data storage devices mounted on the central plate, where a first row of data storage devices is coupled with a first side of the central plate in a side-by-side arrangement, and a second row of data storage devices is coupled with a second side of the central plate in a side-by-side arrangement. For example, each row of storage devices may be coupled with the central plate such that the bottom of each storage device is in closest proximity to the central plate, i.e., right-side-up on one side and upside-down on the other side. Hence, vibration transfer among the data storage devices, such as due to mechanical cross-coupling, may be inhibited by use of such a rigid shared plate.

Embodiments may include a plurality of flexible mounting grommets fastened to each storage device and coupled to the central plate. Such mounting grommets may be fastened to each storage device in an arrangement in which an even number of grommets are fastened to one side and an odd number of grommets are fastened to an opposing side of the storage device.

Embodiments may include a corresponding adaptor plate to which each respective storage device is fastened, where each adaptor plate is coupled with the central plate such that each storage device is mounted to the central plate by way of its corresponding adaptor plate. A plurality of flexible mounting grommets may be fastened to each adaptor plate and coupled to the central plate.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to mounting multiple data storage devices in a data storage system are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

INTRODUCTION

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

As discussed, data storage systems often include assemblies on which multiple HDDs are mounted and which, in operation, transfer force and/or motion to neighbor HDDs. Consequently, each HDD may experience positioning errors, which affects read-write performance, as a result of such mechanical cross-coupling among neighbor HDDs mounted in each assembly.

One approach to inhibiting such aforementioned mechanical cross-coupling involves using a rigid mounting structure, to which individual HDDs are compliantly mounted. Furthermore, symmetric mounting of the HDDs can be utilized to make efficient use of the space available within a given data storage system enclosure.

Figure 1A:
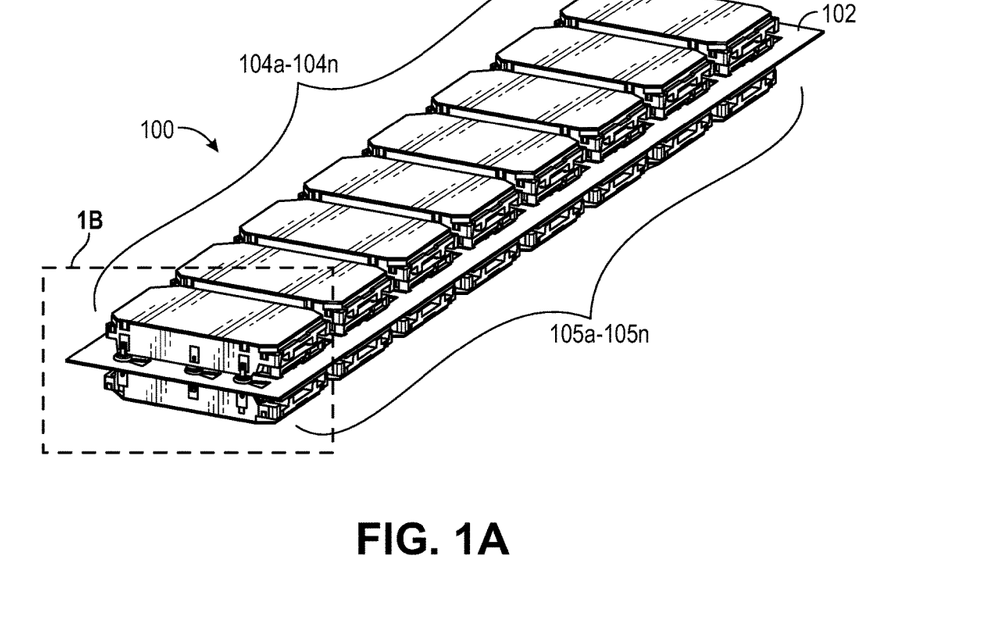
FIG. 1A is a perspective view illustrating a first mounting arrangement for a data storage system, according to an embodiment.
Figure 1B:
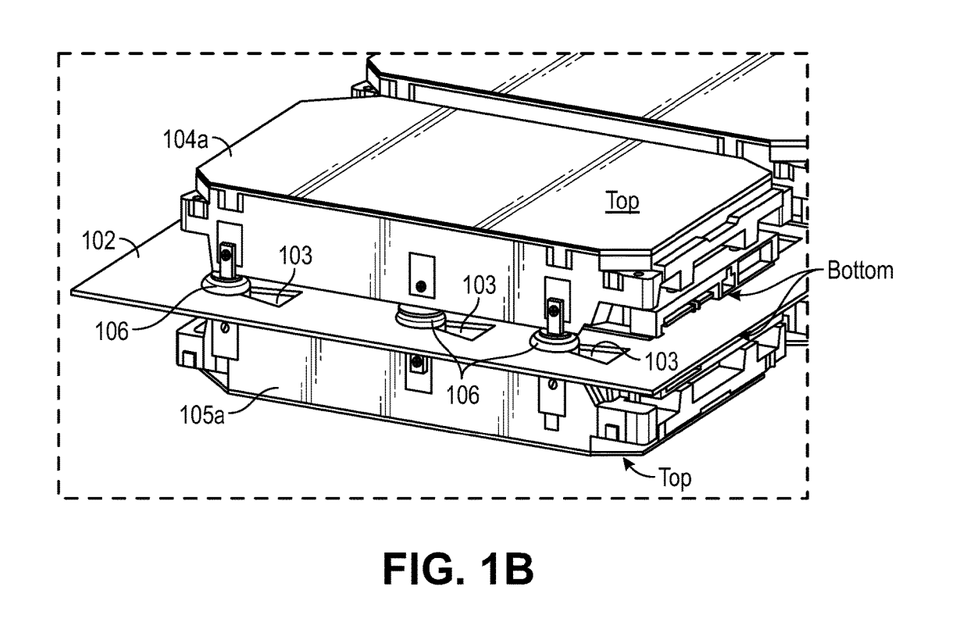
FIG. 1B is a magnified perspective view illustrating the first mounting arrangement for the data storage system of FIG. 1A, according to an embodiment.

Data Storage System Assembly-Central Plate Mounting Storage Device Side Mounting FIG. 1A is a perspective view illustrating a first mounting arrangement for a data storage system, and FIG. 1B is a magnified perspective view illustrating the first mounting arrangement for a data storage system of FIG. 1A, both according to an embodiment.

Data storage system assembly 100 ("assembly 100") comprises a first row of data storage devices 104a-104n coupled with a first side of a rigid central plate 102 in a side-by-side arrangement, and a second row of data storage devices 105a-105n coupled with a second side of the rigid central plate 102 in a side-by-side arrangement, where n represents a number that may vary from implementation to implementation. Use of a rigid mounting plate such as central plate 102 can reduce mechanical cross-coupling, and resultant cross-talk PES (position error signal), relative to other device mounting arrangements (e.g., an over-under mounting arrangement on a shared side divider). According to an embodiment, the rigid plate 102 is composed of a steel material. An alternative metal (such as aluminum), or an alternative material altogether, may be adapted for use in order to achieve a desired rigidity or stiffness. For example, a thicker plate of aluminum could be implemented to achieve a comparable stiffness of a thinner steel plate. However, space is typically a design constraint in the context of a data storage system enclosure so a stiffer material taking up less space may be preferable. According to an embodiment, the rigidity of the central plate 102 corresponds to a plate having a thickness in the range of 0.5-5.0 millimeters. For example, within that range, a steel plate may tend toward a lower range (for a non-limiting example, 0.5-3.0 mm) while a plastic plate may tend toward a higher range (for a non-limiting example, 2.0-5.0 mm). According to an embodiment, each of the first and second rows of storage devices 104a-104n, 105a-105n is coupled with its respective side of the central plate 102 on its bottom side, i.e., such that the bottom of each storage device 104a-104n, 105a-105n is in closest proximity to the central plate 102 (see, e.g., storage devices 104a, 105a of FIG. 1B).

Figure 2:
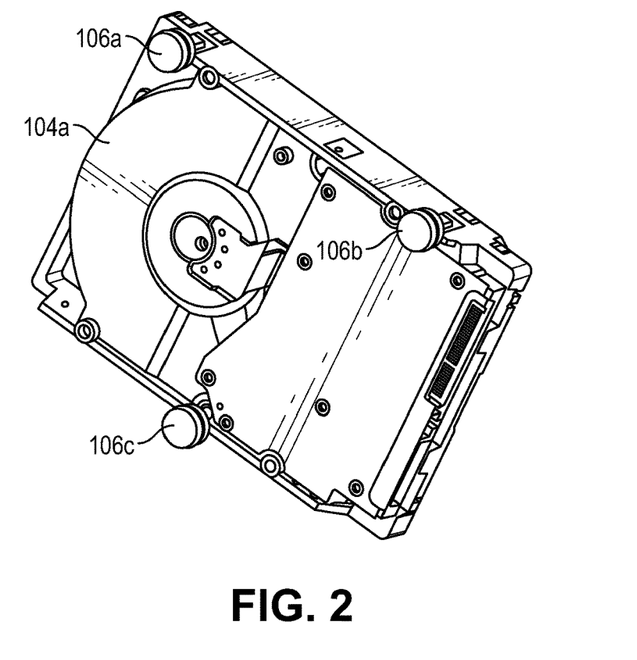
FIG. 2 is a bottom perspective view illustrating a data storage device for mounting in the mounting arrangement of FIG. 1A, according to an embodiment.

According to an embodiment, assembly 100 further comprises a plurality of flexible mounting grommets 106 ("106" is used to refer to the mounting grommets, generally or collectively) fastened to each data storage device 104a-104n, 105a-105n and coupled to the central plate 102. FIG. 2 is a bottom perspective view illustrating a data storage device for mounting in the mounting arrangement of FIG. 1A, according to an embodiment. Depicted in FIG. 2 is a data storage device 104a, to which a plurality (three, in this case) of flexible mounting grommets 106a, 106b, 106c are fastened. According to an embodiment, the mounting grommets 106 (FIG. 1B) are fastened to opposing sides of each storage device 104a-104n, 105a-105n (see, e.g., FIG. 2).

According to an embodiment, the mounting grommets 106 are fastened to each storage device 104a-104n, 105a-105n in an arrangement in which an even number are fastened to a first side and an odd number are fastened to a second opposing side of each storage device 104a-104n, 105a-105n. For example, with reference to FIG. 2, mounting grommets 106a, 106b are fastened to one side of storage device 104a while mounting grommet 106c is fastened to the other side of storage device 104a. Hence, the first row of storage devices 104a-104n and the second row of storage devices 105a-105n can be coupled with the central plate 102 such that their mounting points, such as embodied with the mounting grommets 106, do not interfere with opposing mounting grommets 106. That is, with an asymmetric arrangement of mounting grommets 106 (FIG. 2), the mounting grommets 106 of storage devices 104a-104n will not interfere with the mounting grommets 106 of opposing storage devices 105a-105n when they are all mounted on the central plate 102. This feature is illustrated in FIG. 1B, where two of the mounting grommets 106 (left-most and right-most, such as mounting grommet 106a, 106b of FIG. 2) are fastened to the storage device 104a (upper portions of mounting grommets 106 visible in FIG. 2), whereas a third mounting grommet (middle, such as grommet 106c of FIG. 2) is fastened to an opposing storage device 105a (lower portion of mounting grommet 106 visible in FIG. 2) mounted on the other side of the central plate 102.

Figure 3:
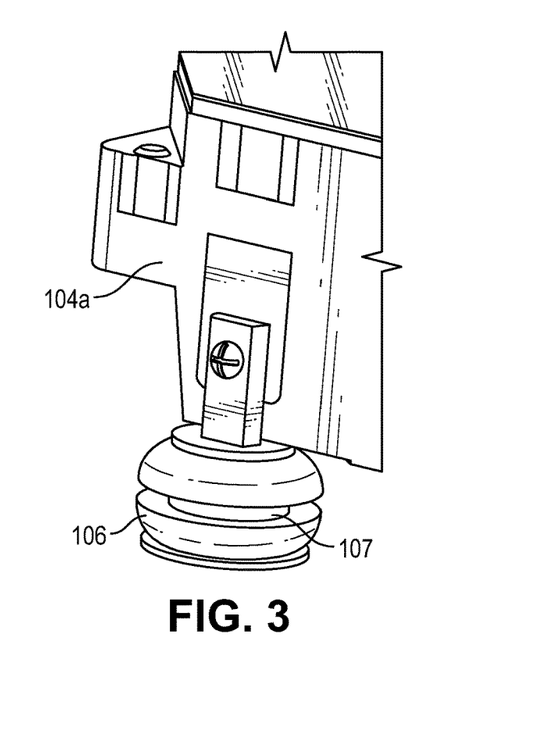
FIG. 3 is a magnified perspective view illustrating the data storage device of FIG. 2, according to an embodiment.

FIG. 3 is a magnified perspective view illustrating the data storage device of FIG. 2, according to an embodiment. Note that the mounting grommet 106 is fastened (e.g., with a screw or other fastener type) to a side mount point of data storage device 104a, according to an embodiment. FIG. 3 depicts the mounting grommet 106 comprising a groove 107 in the flexible and compliant material of the mounting grommet 106, according to an embodiment. Thus, and according to an embodiment, each mounting grommet 106 can be removably coupled to the central plate 102 (FIGS. 1A, 1B) in a "slip-fit" coupling arrangement, in which the groove 107 of the mounting grommet 106 interfaces with a respective cut-out 103 (FIG. 1B) of the central plate 102. While cut-out 103 is depicted in FIG. 1B having a generally triangular shape, the shape(s) of cut-out 103 may vary from implementation to implementation, as long as the cut-out 103 is configured such that the lower half of the mounting grommet 106 (below the groove 107) can be fit through a wider portion of the opening associated with cut-out 107 and then the narrower groove 107 portion can be slid into a narrower portion of the opening associated with cut-out 107 such that the mounting grommet 106 is engaged with the material of the central plate 102 adjacent to the cut-out 103 and therefore held in place.

Mounting grommet 106 comprises a relatively soft, compliant, flexible material in comparison with the material of which the central plate 102 is composed. For a non-limiting example, mounting grommet 106 may be composed of a rubber material. A design trade-off is present regarding material selection (and associated stiffness) for the central plate 102 and the mounting grommets 106, in the context of inhibiting mechanical cross-coupling among data storage devices 104a-104n, 105a-105n mounted on the central plate 102 by way of the mounting grommets 106. As the ratio of the stiffness of the central plate 102 over the stiffness of the mounting grommet 106 increases, the cross-talk displacement (and resultant PES) among the storage devices 104a-104n, 105a-105n decreases somewhat linearly. Thus, one could select a relatively significantly stiff material for the central plate 102 or a relatively significantly soft or pliable material for the mounting grommet 106, or somewhere in between. To the extreme, an infinitely stiff central plate 102 and infinitely pliable mounting grommet 106 could produce maximal stable HDD head positioning. Practically, the stiffer the central plate 102, the stiffer the mounting grommet 106 can be.

Storage Device Bottom Mounting

Figure 4A:
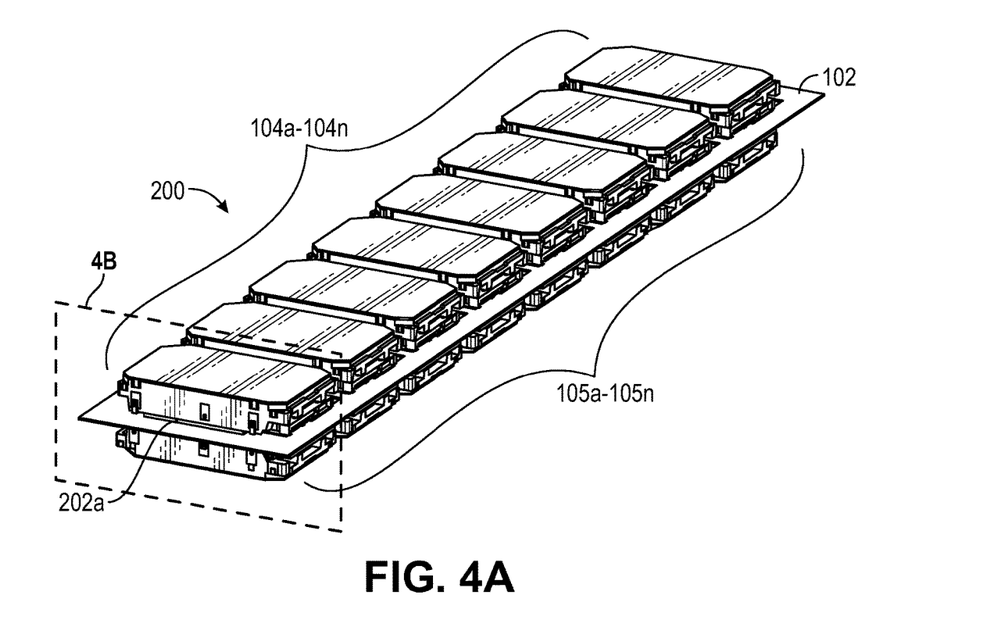
FIG. 4A is a perspective view illustrating a second mounting arrangement for a data storage system, according to an embodiment.
Figure 4B:
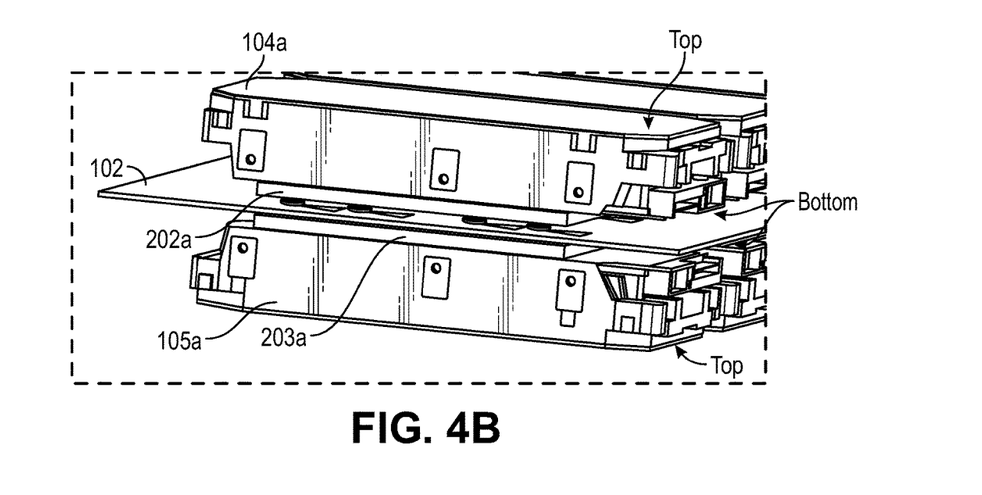
FIG. 4B is a magnified perspective view illustrating the second mounting arrangement for the data storage system of FIG. 4A, according to an embodiment.

FIG. 4A is a perspective view illustrating a second mounting arrangement for a data storage system, and FIG. 4B is a magnified perspective view illustrating the second mounting arrangement for a data storage system of FIG. 4A, both according to an embodiment.

Similar to with data storage assembly 100 (FIGS. 1A-3), data storage system assembly 200 ("assembly 200") comprises a first row of data storage devices 104a-104n coupled with a first side of a rigid central plate 102 in a side-by-side arrangement, and a second row of data storage devices 105a-105n coupled with a second side of the rigid central plate 102 in a side-by-side arrangement, where n represents a number that may vary from implementation to implementation. However, and by contrast, in order to utilize storage device bottom mounting points instead of side mounting points (see, e.g., FIGS. 1B-3), assembly 200 further comprises a respective adaptor plate 202a-202n, 203a-203n corresponding to each storage device 104a-104n, 105a-105n, to which each respective storage device 104a-104n, 105a-105n is fastened (see, e.g., FIG. 4B). Each adaptor plate 202a-202n, 203a-203n is in turn coupled with the central plate 102, such that each respective storage device 104a-104n, 105a-105n is mounted on the central plate 102 by way of its corresponding adaptor plate 202a-202n, 203a-203n. According to an embodiment, each of the first and second rows of storage devices 104a-104n, 105a-105n is fastened to its respective adaptor plate 202a-202n, 203a-203n on its bottom side, i.e., such that the bottom of each storage device 104a-104n, 105a-105n is in closest proximity to the respective adaptor plate 202a-202n, 203a-203n (see, e.g., storage devices 104a, 105a of FIG. 4B).

Figure 5A:
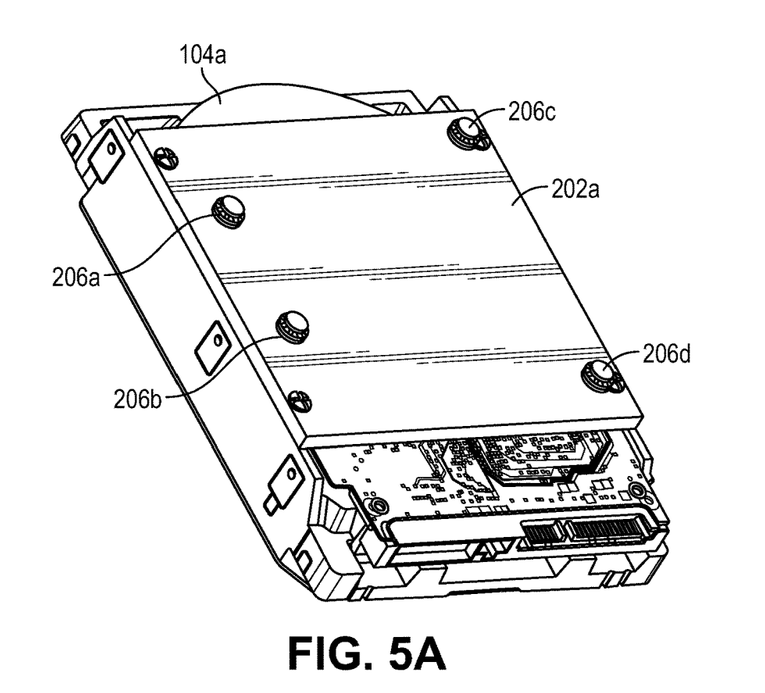
FIG. 5A is a bottom perspective view illustrating a data storage device for mounting in the mounting arrangement of FIG. 4A, according to an embodiment.
Figure 5B:
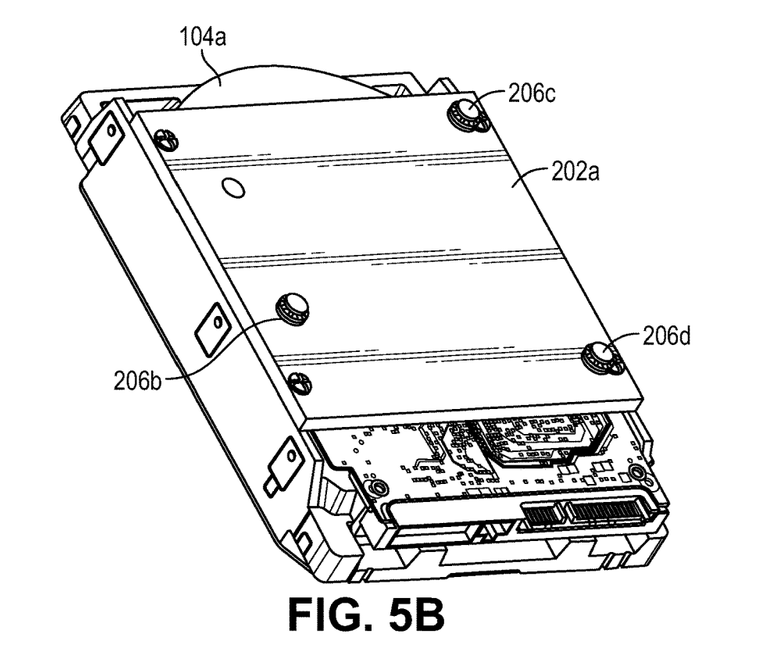
FIG. 5B is a bottom perspective view illustrating a data storage device for mounting in the mounting arrangement of FIG. 4A, according to an embodiment.

According to an embodiment, assembly 200 further comprises a plurality of flexible mounting grommets 206 ("206" is used to refer to the mounting grommets, generally or collectively) fastened to each adaptor plate 202a-202n, 203a-203n and coupled to the central plate 102. FIG. 5A is a bottom perspective view illustrating a data storage device for mounting in the mounting arrangement of FIG. 4A, according to an embodiment. Depicted in FIG. 5A is an adaptor plate 202a to which a storage device 104a is fastened, and to which a plurality (four, in this case) of flexible mounting grommets 206a, 206b, 206c, 206d are fastened. FIG. 5B is a bottom perspective view illustrating a data storage device for mounting in the mounting arrangement of FIG. 4A, according to an embodiment. Depicted in FIG. 5B is an adaptor plate 202a to which a storage device 104a is fastened, and to which a plurality (three, in this case) of flexible mounting grommets 206b, 206c, 206d are fastened. FIGS. 5A, 5B illustrate that the number of mounting grommets 206 attached to a given adaptor plate 202a-202n, 203a-203n may vary from implementation to implementation, while utilizing a common adaptor plate 202a-202n, 203a-203n. With an asymmetric (side-vs.-side) arrangement of mounting grommets 206 (see, e.g., FIGS. 5A, 5B), the mounting grommets 206 of storage devices 104a-104n can be configured to not interfere with the mounting grommets 206 of opposing storage devices 105a-105n when they are all mounted on the central plate 102 by way of each corresponding adaptor plate 202a-202n, 203a-203n.

Reference is made to FIG. 3 for a magnified view of the mounting grommet 106, which may be similar to the mounting grommet 206. That is, mounting grommet 206 may also comprise a groove 107 in the flexible and compliant material of the mounting grommet 206. Therefore, and according to an embodiment, each mounting grommet 206 can be removably coupled to the central plate 102 in a similar "slip-fit" coupling arrangement in which the groove 107 of the mounting grommet 206 interfaces with a respective cut-out 103 (FIG. 1B) of the central plate 102.

Method for Inhibiting Mechanical Cross-Coupling Among Neighbor Devices

Figure 6:
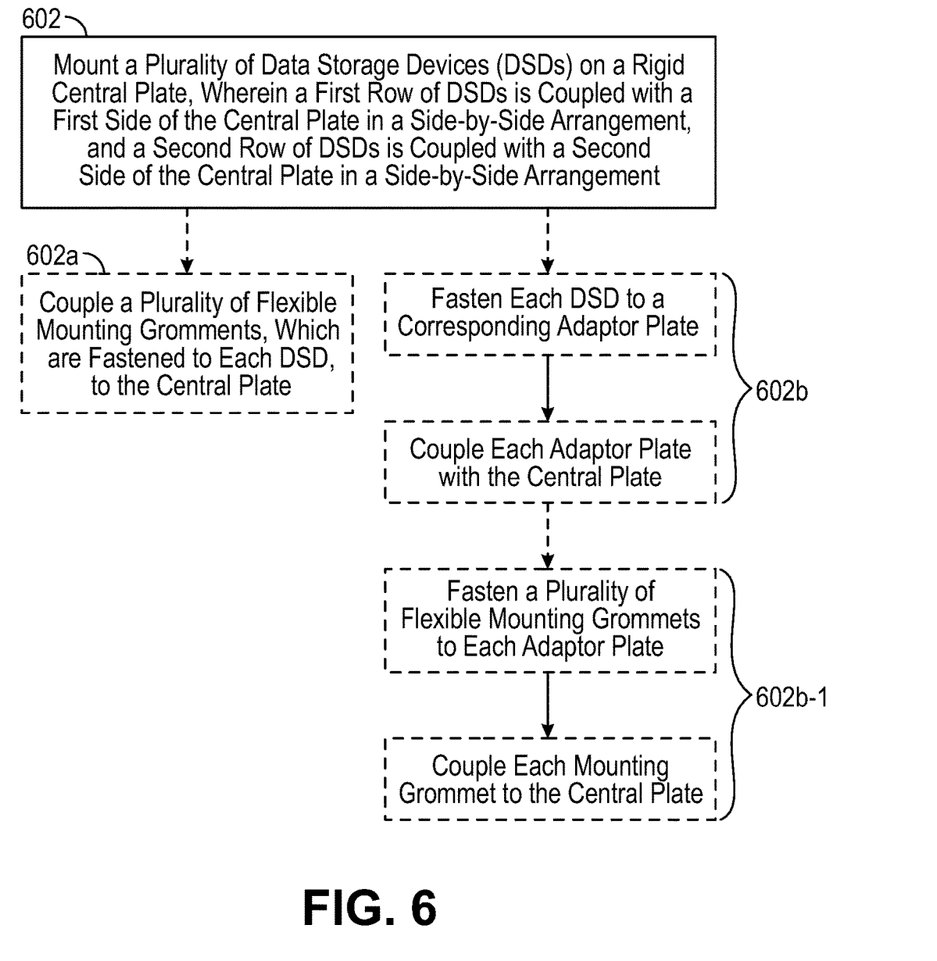
FIG. 6 is a flow diagram illustrating a method for inhibiting mechanical cross-coupling among neighbor devices, according to an embodiment.

FIG. 6 is a flow diagram illustrating a method for inhibiting mechanical cross-coupling among neighbor devices, according to an embodiment. An example use includes inhibiting mechanical cross-coupling among neighbor hard disk drives (see, e.g., data storage devices 104a-104n, 105a-105n of FIGS. 1A-5B) housed in a data storage device system enclosure.

At block 602, a plurality of data storage devices (DSDs) are mounted on a rigid central plate, wherein a first row of storage devices is coupled with a first side of the central plate in a side-by-side arrangement and a second row of storage devices is coupled with a second side of the central plate in a side-by-side arrangement. For example, data storage devices 104a-104n are coupled with the top side of the central plate 102 (FIGS. 1A, 1B, 4A, 4B) and data storage devices 105a-105n are coupled with the bottom side of the central plate 102 (FIGS. 1A, 1B, 4A, 4B). According to an embodiment, mounting at block 602 includes coupling each of the first and second rows of storage devices 104a-104n, 105a-105n with its respective side of the central plate 102 on its bottom side, i.e., such that the bottom of each storage device 104a-104n, 105a-105n is in closest proximity to the central plate 102 (see, e.g., storage devices 104a, 105a of FIG. 1B).

As described elsewhere herein, data storage devices mounting options are available. According to an embodiment, at optional block 602a, mounting the data storage devices includes coupling a plurality of flexible mounting grommets, which are fastened to each storage device, to the central plate. For example, mounting grommets 106 (FIG. 1B), which are fastened to storage device 104a (FIGS. 2, 3), are coupled to the central plate 102 (FIG. 1B).

According to an embodiment, the mounting grommets (e.g., mounting grommets 106a-106c of FIG. 1B) are fastened to each storage device 104a-104n, 105a-105n (FIGS. 1A, 1B, 4A, 4B) in an arrangement in which an even number are fastened to a first side and an odd number are fastened to a second opposing side of each storage device 104a-104n, 105a-105n. For example, with reference to FIG. 2, mounting grommets 106a, 106b are fastened to one side of storage device 104a while mounting grommet 106c is fastened to the other side of storage device 104a. Hence, the first row of storage devices 104a-104n and the second row of storage devices 105a-105n can be coupled with the central plate 102 (FIGS. 1A, 1B, 4A, 4B) such that their mounting points, such as embodied with the mounting grommets 106, do not interfere with opposing mounting grommets 106. That is, with an asymmetric arrangement of mounting grommets 106 (FIG. 2), the mounting grommets 106 of storage devices 104a-104n will not interfere with the mounting grommets 106 of opposing storage devices 105a-105n when they are all mounted on the central plate 102.

According to an embodiment, coupling the mounting grommets 106 (FIG. 2) to the central plate 102 at block 602a includes coupling each mounting grommet 106 to the central plate 102 (FIGS. 1A, 1B) in a "slip-fit" coupling arrangement, in which the groove 107 (FIG. 3) of the mounting grommet 106 interfaces with a respective cut-out 103 (FIG. 1B) of the central plate 102, such that the lower half of the mounting grommet 106 (below the groove 107) can be fit through a wider portion of the opening associated with cut-out 107 and then the narrower groove 107 portion can be slid into a narrower portion of the opening associated with cut-out 107 and the mounting grommet 106 is engaged with the material of the central plate 102 adjacent to the cut-out 103 and therefore held in place.

Continuing with FIG. 6, at optional block 602b, according to an embodiment, mounting the data storage devices includes fastening each storage device to a corresponding adaptor plate, and coupling each adaptor plate with the central plate, such that each respective storage device is mounted on the central plate by way of the corresponding adaptor plate. For example, each data storage device 104a-104n, 105a-105n (FIGS. 4A, 4B) is fastened to a corresponding adaptor plate 202a, 203a (FIG. 4B), and each adaptor plate 202a, 203a is coupled with the central plate 102 (FIGS. 4A, 4B).

At optional block 602b-1, according to an embodiment, coupling each adaptor plate to the central plate includes fastening a plurality of flexible mounting grommets to each adaptor plate, and coupling each mounting grommet to the central plate. For example, mounting grommets 206 (FIGS. 5A, 5B) are fastened to each adaptor plate 202a, 203a (FIG. 4B), and each mounting grommet 206 is coupled to the central plate 102 (FIGS. 4A, 4B). As with the mounting grommets 106 (see, e.g., FIG. 2), according to an embodiment, coupling the mounting grommets 206 to the central plate 102 at block 602b-1 includes coupling each mounting grommet 206 to the central plate 102 in a "slip-fit" coupling arrangement, as described elsewhere herein.

According to an embodiment, a further action that may be associated with the foregoing method for inhibiting mechanical cross-coupling among neighbor devices involves electrically connecting a flexible electrical cable between each data storage device and a circuit external to the data storage device. For example, a data storage device 104a-104n, 105a-105n (FIGS. 1A, 1B, 4A, 4B) is electrically connected with a PCB associated with or coupled with a data storage system enclosure assembly by way of a "flex cable". Use of a flexible electrical interface rather than a common rigid electrical interface (e.g., directly to a common PCB) can further reduce mechanical cross-coupling and resultant cross-talk PES (position error signal) among the group of storage devices.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A data storage system assembly comprising:
   a rigid unitary central plate extending uninterrupted between a first end of said central plate and a second end of said central plate; and
   a plurality of data storage devices mounted on said central plate, wherein:
   a first row of multiple said data storage devices is coupled with a first side of said central plate in a side-by-side arrangement such that first mounting parts corresponding to said first row of data storage devices extend through said central plate to a second side of said central plate; and
   a second row of multiple said data storage devices is coupled with the second side of said central plate in a side-by-side arrangement such that second mounting parts corresponding to said second row of data storage devices extend through said central plate to said first side of said central plate.

2. The data storage system assembly of claim 1, wherein said first row of said data storage devices is coupled with said first side of said central plate and said second row of said data storage devices is coupled with said second side of said central plate such that a bottom of each said data storage device is in closest proximity to said central plate.

3. The data storage system assembly of claim 1,
   wherein said first and second mounting parts comprise a plurality of flexible mounting grommets fastened to each said data storage device and coupled to said central plate.

4. The data storage system assembly of claim 3, wherein said plurality of mounting grommets are fastened to opposing sides of each said data storage device.

5. The data storage system assembly of claim 3, wherein said plurality of mounting grommets are coupled to said central plate in a slip-fit removable coupling arrangement in which a groove of each said mounting grommet interfaces with a respective cut-out in said central plate.

6. The data storage system assembly of claim 3, wherein said plurality of mounting grommets are fastened to each said data storage device in an arrangement in which an even number of mounting grommets are fastened to a first side and an odd number of mounting grommets are fastened to a second side, opposing said first side, of each said data storage device, such that respective said mounting grommets corresponding to each data storage device of a pair of data storage devices that are adjacently mounted on opposing sides of said central plate do not interfere with each other.

7. The data storage system assembly of claim 6, wherein said first row of said data storage devices is coupled with said first side of said central plate and said second row of said data storage devices is coupled with said second side of said central plate such that a bottom of each said data storage device is in closest proximity to said central plate.

8. The data storage system assembly of claim 7, wherein two mounting grommets are fastened to said first side and one mounting grommet is fastened to said second side of each said data storage device.

9. The data storage system assembly of claim 1, further comprising:
a plurality of adaptor plates corresponding to said plurality of data storage devices, wherein each respective data storage device is fastened to a corresponding adaptor plate;
wherein each said adaptor plate is coupled with said central plate such that each respective data storage device is mounted on said central plate by way of said corresponding adaptor plate.

10. The data storage system assembly of claim 9,
wherein said first and second mounting parts comprise a plurality of flexible mounting grommets fastened to each said adaptor plate and coupled to said central plate.

11. The data storage system assembly of claim 10, wherein said plurality of mounting grommets are coupled to said central plate in a slip-fit removable coupling arrangement in which a groove of each said mounting grommet interfaces with a respective cut-out in said central plate.

12. The data storage system assembly of claim 9, wherein a bottom of each respective data storage device is fastened to said corresponding adaptor plate.

13. The data storage system assembly of claim 1, wherein said central plate is composed of steel.

14. The data storage system assembly of claim 1, further comprising:
a plurality of flexible electrical cables corresponding to the plurality of data storage devices, wherein a respective flexible electrical cable electrically connects a corresponding data storage device to a common circuit external to said data storage device.

15. A method for inhibiting mechanical cross-coupling among neighbor data storage devices housed in a data storage system enclosure, the method comprising:
mounting a plurality of data storage devices on a unitary rigid central plate extending uninterrupted between a first end of said central plate and a second end of said central plate, wherein:
a first row of said data storage devices is coupled with a first side of said central plate in a side-by-side arrangement such that first mounting parts corresponding to said first row of data storage devices extend through said central plate to a second side of said central plate; and
a second row of said data storage devices is coupled with the second side of said central plate in a side-by-side arrangement such that second mounting parts corresponding to said second row of data storage devices extend through said central plate to said first side of said central plate.

16. The method of claim 15, wherein mounting includes coupling said first row of said data storage devices with said first side of said central plate and coupling said second row of said data storage devices with said second side of said central plate such that a bottom of each said data storage device is in closest proximity to said central plate.

17. The method of claim 15, wherein mounting with said mounting parts includes coupling a plurality of flexible mounting grommets, which are fastened to each said data storage device, to said central plate.

18. The method of claim 17, wherein:
said plurality of mounting grommets are fastened to each said data storage device in an arrangement in which an even number of mounting grommets are fastened to a first side and an odd number of mounting grommets are fastened to a second side, opposing said first side, of each said data storage device; and
said plurality of mounting grommets are coupled to said central plate in a slip-fit removable coupling arrangement in which a groove of each said mounting grommet interfaces with a respective cut-out in said central plate.

19. The method of claim 15, wherein mounting includes fastening each respective data storage device to a corresponding adaptor plate and coupling each said adaptor plate with said central plate such that each respective data storage device is mounted on said central plate by way of said corresponding adaptor plate.

20. The method of claim 19, wherein:
coupling each said adaptor plate with said central plate includes fastening a plurality of flexible mounting grommets to each said adaptor plate and coupling said mounting grommets to said central plate; and
said plurality of mounting grommets are coupled to said central plate in a slip-fit removable coupling arrangement in which a groove of each said mounting grommet interfaces with a respective cut-out in said central plate.

21. The method of claim 19, wherein fastening each respective data storage device to a corresponding adaptor plate includes fastening a bottom of each respective data storage device to said corresponding adaptor plate.

22. The method of claim 15, further comprising:
electrically connecting a respective flexible electrical cable between each said data storage device and a circuit external to said data storage device.

\* \* \* \* \*